United States Patent [19]
Schilling

[11] 3,937,082
[45] Feb. 10, 1976

[54] GAUGE SYSTEM FOR MEASURING AIR FLOW IN DUCTS

[75] Inventor: John E. Schilling, Indianapolis, Ind.
[73] Assignee: Schilling Chilling Manufacturing Corporation, Indianapolis, Ind.
[22] Filed: Sept. 6, 1974
[21] Appl. No.: 503,862

[52] U.S. Cl. .................................. 73/208; 73/212
[51] Int. Cl.² ........................................... G01G 1/34
[58] Field of Search .............. 73/205, 208, 209, 212

[56] References Cited
UNITED STATES PATENTS

| | | | |
|---|---|---|---|
| 2,003,474 | 6/1935 | Schweitzer | 73/208 |
| 2,009,427 | 7/1935 | Bentzel | 73/212 |
| 2,706,409 | 4/1955 | Preston | 73/212 |
| 3,020,757 | 2/1962 | Parish | 73/212 |
| 3,408,865 | 11/1968 | Chenault | 73/208 |
| 3,581,565 | 6/1971 | Dieterich | 73/212 |
| 3,603,148 | 9/1971 | Rikuta | 73/209 |
| 3,693,441 | 9/1972 | Obstfelder | 73/208 |

*Primary Examiner*—Herbert Goldstein
*Attorney, Agent, or Firm*—Jenkins, Hanley & Coffey

[57] ABSTRACT

For use in measuring air velocity and pressure changes in a duct, a gauging system comprising a gauge including a vertically extending transparent tube within which a ball moves to a position corresponding to the pressure in the tube above and below the ball, a velocity scale and a pressure scale extending alongside the tube and increasing from their lower end to their upper end, a vertically extending transparent shell enclosing the tube, and one or more rigid tubes for connecting the lower end of the gauge tube to the interior of the duct to read total pressure or static pressure and a flexible tube for connecting the upper end of the shell to the interior of the duct to read static pressure. The rigid tube or tubes provide a distal end portion with an open end arranged to be pointed upstream or opposite to the direction of flow of air through the duct to read total pressure including velocity pressure and static pressure while the flexible tube provides a distal end portion with an open end and arranged to read the static pressure. The static pressure, therefore, pushes downwardly upon the ball while the total pressure pushes upwardly on the ball such that the static pressure is subtracted from the total pressure leaving velocity pressure which corresponds to velocity. The gauging system can simply be carried into a walk-in duct to read the air velocity therein without drilling or cutting access holes in the duct wall. The gauging system can be used to read pressure drop or increase across an item such as a coil or fan in a duct.

13 Claims, 10 Drawing Figures

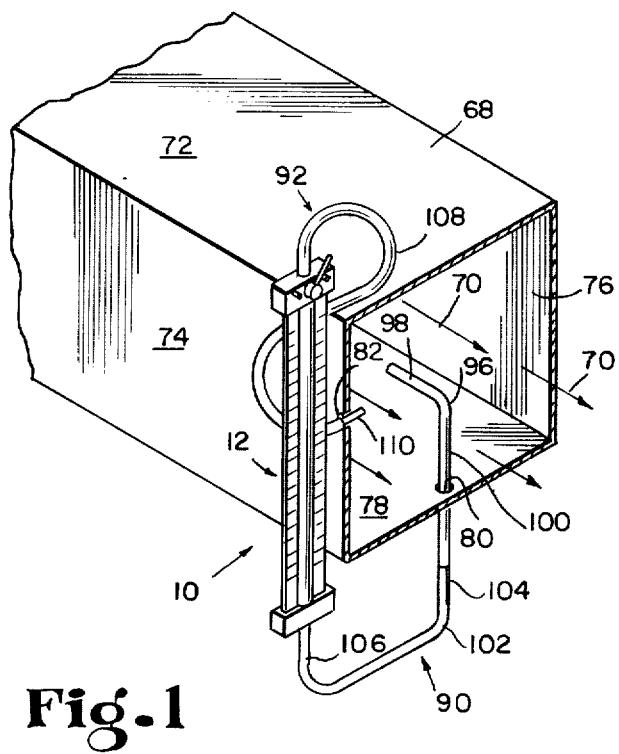
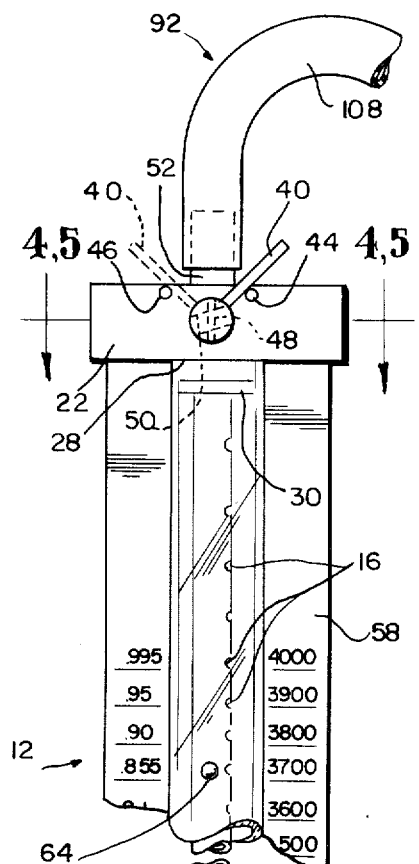
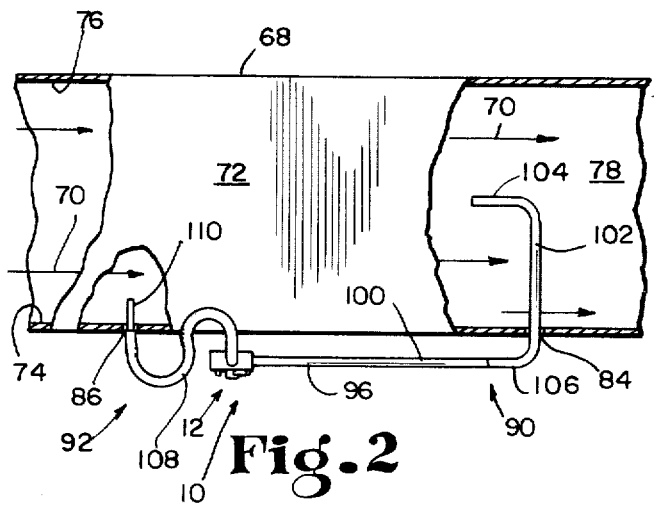
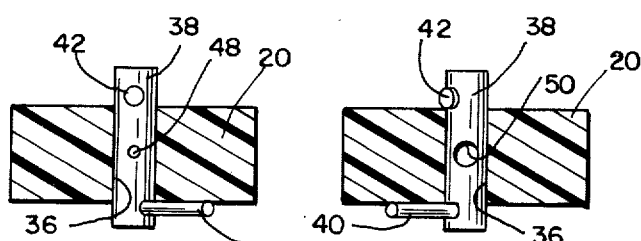
Fig. 1
Fig. 2
Fig. 3
Fig. 4
Fig. 5

GAUGE SYSTEM FOR MEASURING AIR FLOW IN DUCTS

It is a primary object of the present invention to provide a low cost, durable, and easy-to-use gauge for measuring air velocity or pressure drop or pressure increase inside a duct. Importantly, the present invention provides a break-through in that an air-conditioning technician can be provided with a very easy to use and easy to understand gauging system which will read air velocity directly in feet per minute (fpm). The technician is not required to work with tables or charts to calculate air velocity inside a duct. In fact, the present invention makes the Pitot tube obsolete to the air-conditioning technician. While the average technician has never been able to use sucessfully a Pitot tube and all the calculations involved therewith, any technician can use the system of the present invention easily to read air flow velocity directly without calculation, in feet per minute.

I refer to my copending application Ser. No. 441,042, filed Feb. 11, 1974, which discloses a slide rule-type computer for calculating total air flow in cubic feet per minute (cfm) when the air velocity is known and the duct, diffuser or grill size and characteristics are known. With the gauging system of the present invention and such a computer, a technician can very quickly and easily determine air flow in (cfm).

The accuracy of the system of the present invention is phenomenal. The gauge portion of the system has been checked by a testing organization and found to be 98% accurate as compared to a laboratory-type inclined manometer which is considered to be very accurate.

With the equipment of the present invention, all a technician has to do is to drill or otherwise to form a couple of small openings in the wall of a duct. Using the system of the present invention, the technician reads total pressure including static pressure and velocity pressure through one of the openings and simultaneously reads static pressure through the other opening. The system of the present invention is designed to subtract automatically the static pressure from the total pressure to provide velocity pressure which, in turn, corresponds to velocity. The system of the present invention includes an air velocity scale expressed in feet per minute (fpm).

The prior art includes several patents showing various devices for measuring air velocity. Such patents are, U.S. Pat. Nos. 2,003,474; 1,947,923; 979,516; 1,454,301; 2,413,352; 2,087,279; 1,889,705; 2,645,124; 2,655,041; 2,827,008; and 2,993,374. Reference is made to these prior art patents and to the prior art references cited therein.

The Dwyer et al. U.S. Pat. No. 2,993,374 shows a commercially available air meter offered by the F. W. Dwyer Mfg. Company, Michigan City, Indiana, as its Series VT air volume gauges. The Dwyer et al. gauge shown in U.S. Pat. No. 2,993,374 and in the advertisements by the F. W. Dwyer Mfg. Company establish that the gauge is to be used twice, once to measure total pressure and another time to measure static pressure. In other words, only one tube at a time can be hooked to the Dwyer gauge. The system of the present invention differs from the Dwyer system in that one tube or tube means can be hooked to one end of the gauge to read total pressure while another tube or tube means is hooked to the other end of the gauge to read static pressure and automatically to subtract the static pressure from the total pressure, leaving velocity pressure which corresponds to velocity expressed in feet per minute on a scale adjacent the velocity pressure scale.

The F. W. Dwyer Mfg. Company does offer for sale gauging systems which read velocity pressure directly and which include an input of total pressure and an input of static pressure, but these gauges include inclined manometers which would be difficult if not impossible for most air-conditioning mechanics to use.

The two Schweitzer U.S. Pat. Nos. 1,947,923 and 2,003,474 identified above show gauging devices including vertically extending tubes within which light-weight balls travel to indicate velocity pressure or velocity. The devices of those Schweitzer patents, however, differ from the device of the present invention in that they are not designed for reading, within a duct, velocity pressure directly by taking simultaneously total pressure and static pressure readings and automatically subtracting the static pressure readings.

The use of an impact tube velocity pressure measuring system is taught, in principle, in laboratory books. Reference is made, for instance, to chapter 38, *Testing, Adjusting and Balancing* by A.S.H.R.A.E. *Guide and Data Book — Systems —* 1970 and to FIG. 15 which shows, diagrammatically, an impact meter reading simultaneously velocity pressure and total pressure. However, on page 609 which includes FIG. 15, there is the statement "Velocity impact meters (FIG. 15) generally have a very high cost because of a need for precise construction and calibration. The meters are generally of specially contoured glass or plastics permitting observation of a flow float. As flow increases, the flow float rises in the see-through calibrated tube permitting observation of flow rate. Velocity impact meters generally have high accuracy, but are so expensive that their major use is in the laboratory."

Of course, the system of the present invention constitutes an improvement because, for the first time and in contrast to the above-quoted statement, a technician can be provided a low cost gauging system which is quite rugged and which can be used in the field accurately to measure air velocity in all sorts of ducts. It is the technician who must care for the heating and cooling systems after they are installed, but the complexities of present air measuring systems make such care extremely difficult.

The system of the present invention comprises a gauge including a vertically upwardly extending transparent gauge tube having an open lower end and an open upper end, the tube having a plurality of vertically spaced apart venting apertures in the side wall thereof, a vertically extending transparent shell enclosing the tube and having an upper end extending above the upper end of the tube and a lower end closed to the lower end of the tube, a light-weight ball movable in the tube to a vertical position corresponding to the pressure therein above and below the ball, and means providing an air velocity scale extending alongside the tube and increasing from the lower end to the upper end. Such a tube has been offered commercially for several years by the assignee of the present application. Its use, up until the present invention, has been in reading the velocity of air emanating from a diffuser or grill or in reading the velocity of air moving into a return air duct or up a flue. In the past, before the present invention, a flexible tube was placed on the lower end of the gauge tube and the distal end of the flexible tube was held to receive air emanating from a diffuser or grill into a room. The height to which the ball would move would read directly the velocity of the air. The velocity of air entering a return air duct or going up a flue was read by placing a flexible tube on the upper end of the shell or in connection with the upper end of the shell and then sticking the distal end of the flexible tube adjacent to or into the grill or upwardly into the flue. Of course, in reading air velocity in an open space as contrasted to the space within a duct, the static pressure can be, for all practical purposes, ignored. Inside a duct, however, the static pressure must be taken into consideration.

The system of the present invention further includes first tube means for connecting the lower end of the gauge tube to the interior of the duct, the first tube means having a distal end portion with an open end arranged to be pointed upstream opposite to the direction of flow of air through the duct to read total pressure including velocity pressure and static pressure, and second tube means for connecting the upper end of the gauge shell to the interior of the duct, the second tube means having a distal end portion with an open end arranged to extend into the duct to be pointed away from upstream to read the static pressure. The second tube means may also have a distal end portion with an open end pressed against the duct wall to surround an opening therein to read static pressure. In the system of the present invention, the total pressure pushes upwardly upon the light-weight ball while the static pressure introduced at the upper end of the shell pushes downwardly upon the ball to subtract the static pressure from the total pressure. Now, with such a system, the technician automatically reads velocity pressure, or to him, the velocity pressure expressed in velocity of feet per minute.

Importantly, the system of the present invention can simply be carried into a walk-in duct to read the air velocity therein without drilling or cutting holes in the wall of the duct.

Still further, the gauging system of the present invention is designed to be used in measuring pressure changes, i.e., increases or decreases, across apparatus in ducts. For instance, the system may be used to measure the pressure change across a fan or blower in a duct or duct system as well as across a filter, evaporator coil or other such item. The simultaneous reading of static pressure on the suction side and exhaust side of a fan is readily connected into air flow capacity in cfm of the fan. In reading pressure change across a fan, the upper end of the gauge shell is connected to the suction side of the fan and the lower end of the gauge tube is simultaneously connected to the exhaust side of the fan. In reading pressure change across an item such as a filter or evaporator, the upper end of the gauge shell is connected to the duct downstream from the item while the lower end of the gauge tube is simultaneously connected to the duct upstream from the item.

Other objects and features of the present invention will become apparent as this description progresses.

To the accomplishment of the above and related objects, this invention may be embodied in the forms illustrated in the accompanying drawings, attention being called to the fact, however, that the drawings are illustrative only, and that changes may be made in the specific constructions illustrated and described, so long as the scope of the appended claims is not violated.

In the drawings:

FIG. 1 is a fragmentary perspective view showing the gauging system of the present invention;

FIG. 2 is a fragmentary view, partially cut away and partially sectioned, showing the gauging system applied in a different manner to a duct;

FIG. 3 is an elevational view of the gauge portion of the system of the present invention;

FIGS. 4 and 5 are sectional views taken generally along the lines 4, 5–4, 5 in FIG. 3;

Figure 6:
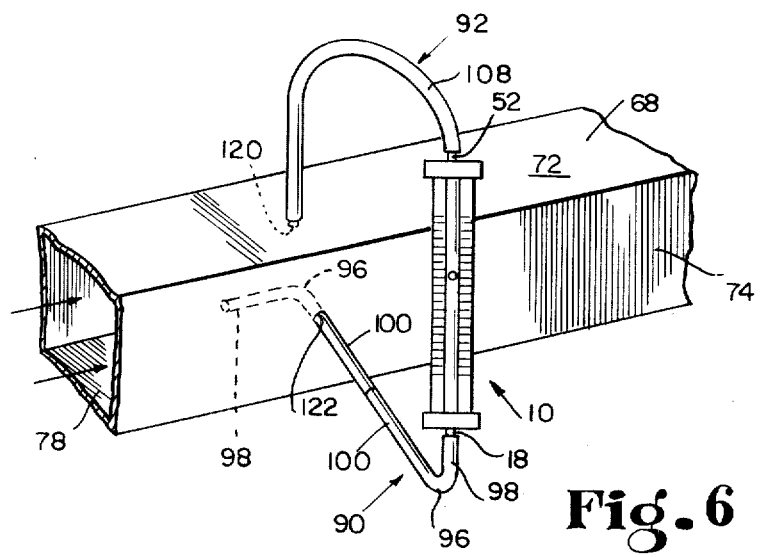
FIG. 6 is a fragmentary view showing the gauging system applied in a different manner to a duct.

Referring now more particularly to the drawings, it will be seen that the gauge system is identified generally by the reference numeral 10 and that it includes a gauge 12 shown in some detail in FIGS. 3, 4, and 5. The gauge 12 comprises a transparent plastic tube 14 which has, throughout most of its length, longitudinally spaced apart apertures 16. These apertures, near the lower end of the tube 14, may be quite small in diameter. The apertures become increasingly larger in diameter toward the upper end of the tube 14. For instance, the tube 14 may have a ¼ inch internal diameter and the apertures near the lower end of the tube may be as small as 1/32 inch or smaller while the apertures adjacent the upper end of the tube may be as large as ⅛ inch in diameter. While the tube may be, for instance, approximately one foot long, the apertures may be spaced apart longitudinally somewhat irregularly.

The lower end portion 18 of the gauge tube 14 extends downwardly through a lower block 20. A similar, upper block 22 is provided. Between these blocks, a transparent plastic outer shell 24 extends. This shell 24 is closed to the lower end of the tube 14 in that the shell is sealed to the block 20 as indicated at 26 and the lower end portion 18 of the tube 14 is sealed to the block. The upper end portion of the shell 24 extends above the upper, open end of the tube 14, the shell being sealed to the upper block 22 as indicated at 28. The upper end of the tube 14 is positioned within the larger diameter shell 24 by means of a small plastic stabilizing block 30 which fits over the end of the tube 14 and which engages diametrically opposite portions of the internal wall of the shell. This block 30 has flat sides such that the shell is vented upwardly past the block. The shell 24 is also vented by a valve in the upper block 22. Specifically, the upper block 22 is provided with a bore 36 extending therethrough and having an axis perpendicular to and intersecting the coinciding axes of the tube 14 and shell 24. A cylindrically-shaped valve member 38 is disposed in that bore 36 and held against axial movement therefrom by a handle 40 on one of its ends and a protrusion 42 on the other of its ends. The handle 40, of course, is usable to rotate the valve member 38 about its axis. Stops 44, 46 are provided on the block 22 to limit the movement of the handle 40 in each of two positions of the valve member 38. When the handle 40 is against the stop 44, a small diameter opening 48 in the valve member 38 is axially aligned with the shell 24. When the handle 40 is against the stop 46, a larger diameter opening 50 is in axial alignment with the shell 24. Thus, the upper end of the shell 24 is vented through either a small opening 48 or larger opening 50 through the block 22. A small piece of rigid plastic tubing 52 is attached to the block to be in communication with the shell 24 through the valve member 38.

The small diameter opening 48 corresponds to high scale readings and the large diameter opening 50 corresponds to low scale readings. For instance, the preferred gauge 12 has a low scale reading running from 300 fpm to 1800 fpm and a high scale reading running from 1400 fpm to 4000 fpm. A pair of scales 58, 60 are on opposite sides of the shell 24 to extend longitudinally along the gauge tube 14, the scale 58 being calibrated in feet per minute (fpm) and the scale 60 being calibrated in inches water pressure. The scales 58, 60 are preferably double sided in that one side of each scale is used for low scale and the other side is used for high scale. The pressure and velocity scales are side-by-side for instant comparison.

The gauge 12 is used by holding it substantially vertically and reading the position of a small, light-weight ball 64 which assumes a vertical position in the tube 14 corresponding to the pressure above and below the ball. The ball may be, for instance, a 5/32 inch diameter plastic ball.

In the past, the tube described thus far has been used for reading the velocity of air emanating from a diffuser or grill or for reading the velocity of air entering an intake duct or moving up a flue. The velocity of air emanating from a diffuser or grill has been read by connecting a flexible rubber tube to the lower end portion 18 of the gauge tube 14 and holding the distal end of the flexible tube adjacent the diffuser or grill. The air emanating from the diffuser or grill would force the ball 64 to move upwardly to a position corresponding to the velocity of the air. In reading return air velocity or flue air velocity, the same flexible tube was placed upon the upper tube segment 52 and the distal end of that flexible tube was held in or adjacent to a return air grill or in a flue. The movement of the air would create a vacuum in the flexible tube and lift the ball 64 to a height corresponding to the velocity of the air movement. In other words, the connection was made at the upper end of the shell 24 to create a negative pressure in the upper end of the shell and in the upper end of the gauge tube, permitting atmospheric pressure to push the ball 64 upwardly.

In accordance with the present invention, the gauge 12 is used in a combination not heretofore contemplated. Particularly, referring to FIGS. 1, 2, 6 and 7, it can be seen that the gauge 12 is part of a gauging system 10 adapted for reading velocity pressure and, therefore, air velocity within the confines of an air duct 68. In FIG. 8, the system is carried into a walk-in duct. The illustrative air duct 68 has an upper wall 72, side walls 74, 76 and a bottom wall 78. It will be appreciated, however, that that duct 68 is merely illustrative in that the gauging system 10 of the present invention can be used to read velocity of the air flow in a wide variety of duct configurations. In the FIG. 1 embodiment, a hole 80 is drilled or punched in the bottom wall 78 while another hole 82 is drilled or punched in the side wall 74. In the embodiment of FIG. 2, holes 84, 86 are punched in the side wall 74 to accommodate the gauge system. The purpose of the holes 80, 82, 84, 86, of course, is to give the technician probing access to the interior of the duct 68. The gauging system 10 of the present invention may be used with two holes in the duct wall because the total pressure reading and the static pressure reading are taken simultaneously.

The gauging system 10 comprises first tube means 90 for connecting the lower end of the gauge tube 14 to the interior of the duct and second tube means 92 for connecting the upper end of the shell 24 to the interior of the duct. In the embodiment of FIG. 1, the illustrative first tube means 90 includes an L-shaped rigid probe tube 96 having one leg portion 98 and another leg portion 100. That L-shaped probe tube 96 is connected to the gauge tube 14 by a U-shaped rigid tube 102 including upstanding leg portions 104, 106 connected respectively to the leg 100 of the L-shaped tube 96 and the lower end portion 18. The illustrative second tube means 92 includes a flexible rubber or plastic tube 108 which may have a short rigid tube segment 110 in the distal end thereof. In the embodiment of FIG. 1, the velocity reading is taken by first inserting the L-shaped tube 96 through the opening 80 and positioning the tube so that its leg 98 is pointed upstream and opposite to the direction of air flow through the duct as indicated by the arrows 70. It will be appreciated that the open end of the short leg 98 should receive the air flow at the point of its highest velocity within the duct 68 as well as at the points of lowest velocity. It is recommended that the technician take readings all over the cross section of the duct and average the readings by moving a finger or thumb up and down along the appropriate velocity scale. Just by moving a finger or thumb above the scale between the high and low readings, a technician can quite accurately see the range and determine the average velocity reading without having to record readings. Care should be taken to point the leg section generally in the direction of the axis of the duct. Then, the U-shaped tube 102 can be connected to the leg 100 and then the gauge 12 can be connected to the upstanding leg 106 of the tube 102. The two tubes 96 and 102 provide a rigid tube means which will support the gauge 12 such that the technician can hold the gauge and the tube means 90 with one hand. Then, with his other hand, the technician can extend the distal end portion of the flexible tube 108 through the opening 82 to read the static pressure. it will be appreciated that the stiff tube segment 110 must be directed into the duct such that the air moving longitudinally through the duct will not be directed longitudinally into the open end of the tube segment. In other words, the tube segment 110 must be pointed either transverse to the direction of flow or in the direction of flow of the air such that it will not pick up a velocity component of the air movement. In other words, as will be discussed in conjunction with FIG. 7, it is only necessary "to feel" the static pressure within the duct.

The total pressure read by the tube means 90 will, of course, lift the ball 64 upwardly in the gauge tube 14. The static pressure read by the tube means 92 will push the ball downwardly. Thus, the resultant position of the ball in the gauge tube 14 corresponds to the velocity pressure and the velocity of the air can be read directly on the scale 58. If velocity pressure is needed, it can be read directly on the scale 60 in inches of water pressure.

By knowing the cross sectional area of the duct 68, the technician can easily determine the total volume air flow in cubic feet per minute (cfm) by multiplying the area by the velocity as read directly from the gauging system 10.

While the illustration of FIG. 1 shows the probing taking place through the bottom wall 78 and side wall 74, it will be appreciated that the probing may also take place through two openings 84, 86 in the side wall 74 as shown in FIG. 2. In the embodiment of FIG. 2, the tube means 90 is reversed in that the L-shaped tube 96 supports the gauge 12 while the U-shaped tube 102 is extended into the duct through the opening 84 to read total pressure. That is, the short leg 104 of the U-shaped tube 102 is pointed upstream and opposite to the direction of air flow through the duct to read total pressure.

In this description and in the claims appended hereto, the direction in which the distal end of the probe tube is pointed within the duct is said to be upstream and opposite to the direction of air flow through the duct. In other words, the distal end of the probe tube has to be pointed upstream such that the full velocity component of the air moving downstream will enter the probe tube. The words "opposite to the direction of air flow" is intended to means generally 180° opposite to the downstream flow of air.

Referring to FIG. 6, it will be seen that the gauge 12 is connected to the duct 68 in still a different manner using, as the tube means 90, two L-shaped probe tubes 96 connected together as shown and extending through an opening 122 in the side wall 74 of the duct. In the embodiment of FIG. 6, the flexible tube 108 is connected to the tube portion 52 at its proximal end while its distal end is surrounding a ⅜ inch hole 120 formed in the upper wall 72 of the duct. The tube 108 may be a ½ inch tube such that it can be placed over a ⅜ inch hole 120 drilled in the wall of the duct and pressed against the wall to sense static pressure directly through that hole.

It will be appreciated that the tube portion 18 of the gauge extends downwardly into the leg portion 98 of the L-shaped probe tube 96 such that the gauge 12 can swivel about the vertical axis of the leg portion 98. This greatly facilitates the taking of readings since a technician can simply swivel the gauge so that he can face it squarely and read the scales.

Figure 7:
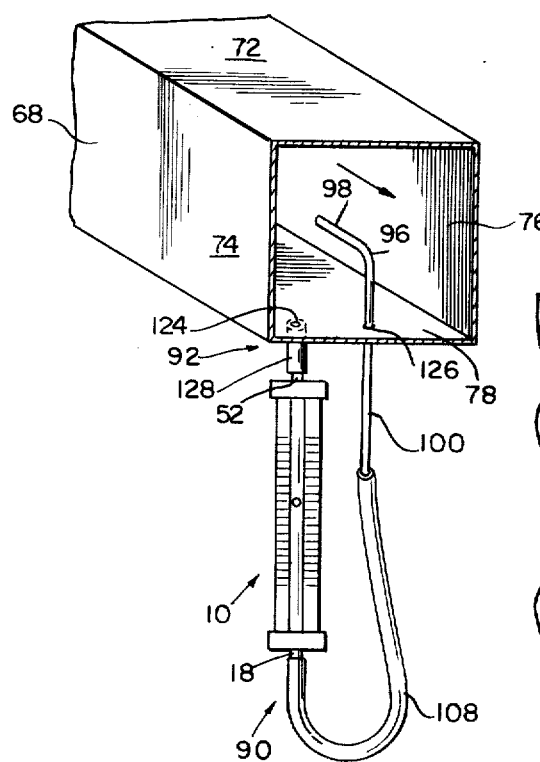
FIG. 7 is a fragmentary view showing the gauging system applied in still a different manner to a duct.
Figure 8:
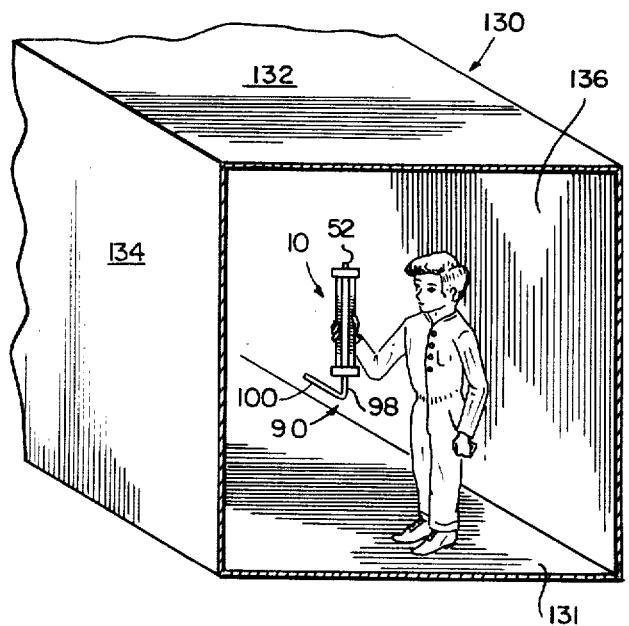
FIG. 8 is a fragmentary view of a walk-in duct showing the system used therein by a technician.

In the embodiment of FIG. 7, readings are taken via two holes 124, 126 drilled or otherwise formed in the bottom wall 78 of the duct 68. In that embodiment, the tube means 92 includes a short segment 128 of flexible rubber tube pressed upwardly against the bottom wall 78 to surround the opening 124 to sense the static pressure within the duct 68. Then, the tube means 90, in the embodiment of FIG. 7, includes the L-shaped probe tube 96 extending upwardly through the opening 126 and being connected to the tube portion 18 at the lower end of the gauge tube 14 by the flexible tube 108. Depending upon the size of the duct 68, it may be necessary to provide an extension on the leg portion 100 of the probe tube 96 to reach all cross sectional areas of the duct 68. Such an extension may be a simple straight tube adapted to be connected between the leg section 100 and the flexible tube 108.

The measuring approach shown in FIG. 7 has turned out to be very satisfactory and, in many cases, it will be the preferred measuring approach. The technician can hold the gauge 12 in one hand and move his finger or thumb along the scales of the gauge to record the high and low positions of the ball while holding the probe tube 96 with his other hand and moving the probe tube to various positions in the duct.

Turning now to FIG. 8, it will be seen that the gauging system of the present invention can simply be carried into a walk-in duct 130 having a floor 131, ceiling 132, and side walls 134, 136. There are many such walk-in ducts in air-conditioning and heating systems of large buildings. A technician can walk into the duct and carry the gauge system 10 with the tube means 90 attached to its lower end as shown, the tube means 90 preferably including the L-shaped probe tube 96. The static pressure, of course, is read directly through the upper open end of the tube portion 52 without any tube means connected thereto. The technician takes care to point the leg section 100 of the probe tube 96 upstream and opposite to the direction of flow of the air through the duct 130. It will be remembered that the technician may simply swivel the gauge 12 about its vertical axis relative to the probe tube 96 so that the technician is always facing the scales of the gauge. The technician will move the probe tube 96 to several different positions in the duct to take readings. By taking readings at these positions, the technician can obtain an average rather easily and quite accurately by moving his finger or thumb along the scale as discussed previously. In the embodiment of FIG. 8, of course, the tube means 92 is not necessary because the entire gauge system is within the duct 130 such that the static pressure is read directly through the short, upwardly extending tube segment 52.

While in FIG. 8, the technician is shown holding the gauging system 10 with his right hand, it will be appreciated that he can and probably will use his left hand to grip and support the probe tube and to point its leg section 100 upstream.

Figure 9:
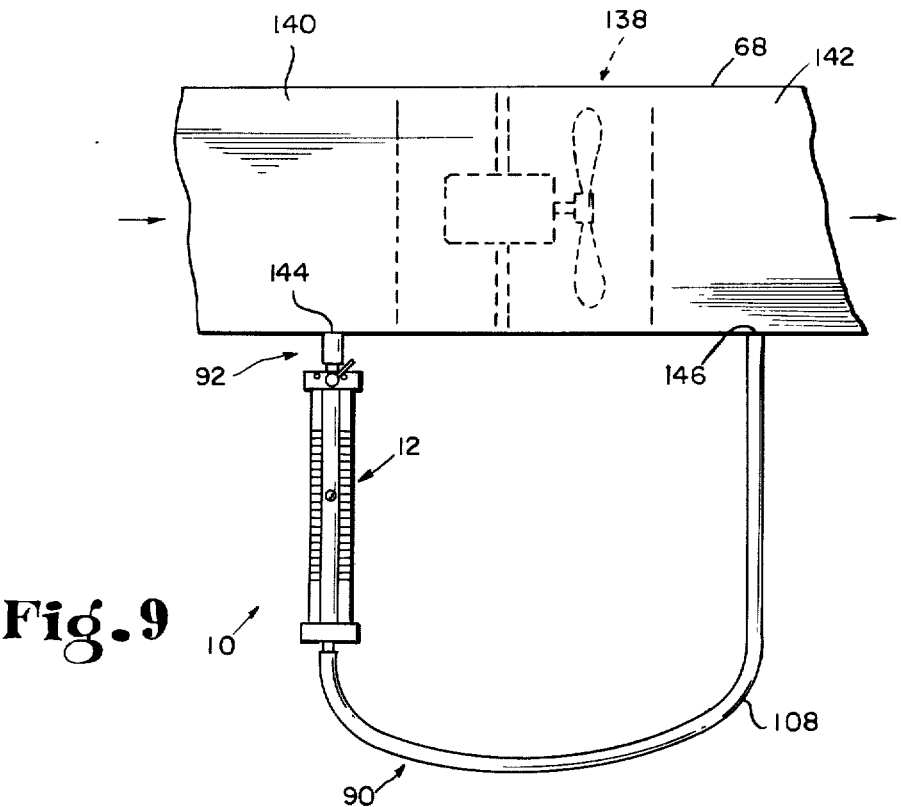
FIG. 9 is a fragmentary elevation view of a duct showing a fan therein somewhat diagrammatically showing how pressure change across a fan can be measured with the system of the present invention.

Referring now to FIG. 9, it will be seen that a fan 138 is illustrated in the duct 68 and that the reference numerals 140, 142 indicate, respectively, the suction side and exhaust side of the fan, i.e., the portions of the duct 68 corresponding to the suction side and exhaust side of the fan. The particular fan 138 is merely illustrative, and it will be appreciated that any number of types of fans or blowers may be installed in a duct or duct system. For instance, the duct 68 may be split into two separate sections and a self-contained blower having its own housing through which the air moves may be inserted in between the two sections.

In any event, the lower end of the gauge tube 14 is connected by the said first tube means 90 to the exhaust side of the fan while the upper end of the shell 24 is connected by the second tube means 92 to the suction side of the fan. In the illustrative embodiment, small holes 144, 146 may be drilled, respectively, in the duct sections 140, 142 and preferably in the bottom walls of such duct sections. These holes may be quite small on the order of ⅜ inch in diameter. It is quite convenient for the first tube means 90 to include the flexible rubber tube 108 having its proximal end connected to the gauge tube 14 and its distal end pressed about the opening 146 to read the static pressure on the exhaust side of the fan. Then, simultaneously, a small rubber tube section such as indicated at 128 in FIG. 7 may be placed over the upstanding rigid tube segment 52 and pressed upwardly to enclose the opening 144 to connect the upper end of the gauge shell 24 to the suction side of the fan to read the static pressure therein. Of course, the static pressure on the suction side of the fan will be a negative pressure while the static pressure on the exhaust side of the fan will be a positive pressure. The positive pressure will, by itself, drive the ball 64 upwardly in the gauge tube 14 to a level corresponding to the static pressure. By connecting the upper end of the gauge shell 24 to the suction side of the fan, the negative pressure on the suction side of the fan will result in the static pressure on the exhaust side of the fan moving the ball even higher in the gauge tube 14. The height to which the ball 64 is moved by the positive static pressure and the negative suction pressure automatically provides an indication of total static pressure change across the fan. This total pressure chain readily converts into the air volume capacity of the fan in the duct environment in which it is used.

Figure 10:
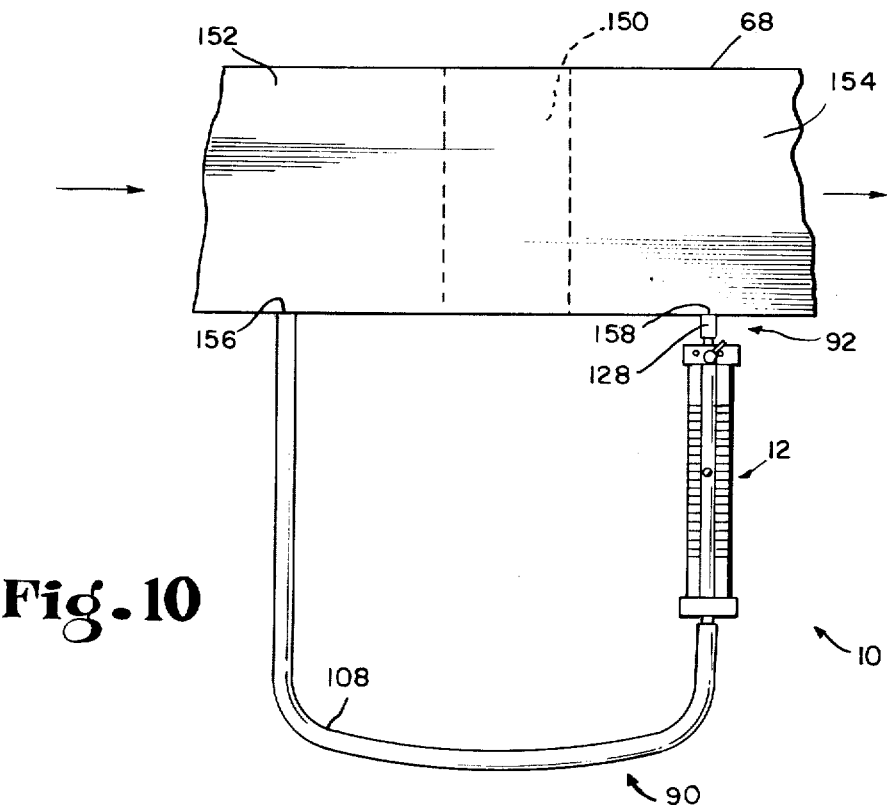
FIG. 10 is another such diagrammatic view showing the system used to read pressure change across an item such as an evaporator or filter.

Just as important to the technician is the amount of pressure drop across, for instance, an obstruction in a duct such as a filter or evaporator. In FIG. 10, such an obstruction is indicated at 150 in the duct 68 to define portions 152, 154 of the duct, respectively, on the upstream side and downstream side of the obstruction. Small openings 156, 158 are placed in the duct portions 152, 154. Then, as compared to the arrangement shown in FIG. 9, the situation is reversed in that the first tube means 90 connects the lower end of the gauge tube 14 to the duct portion 152 upstream from the obstruction while the second tube means 92 connects the upper end of the gauge shell 24 to the downstream portion 154 of the duct. Depending upon the nature of the obstruction 150 such as number of coils, fans, etc., the pressure drop across the obstruction may be quite significant. This pressure drop is automatically determined by the upstream static pressure pushing upwardly on the gauge ball while the downstream static pressure pushes downwardly on the ball automatically to subtract the downstream static pressure from the upstream static pressure.

A kit including the gauge 12, U-shaped tube 102, one or more L-shaped probe tubes 96, an extension tube and flexible tube 108 can be provided for use by technicians in measuring air velocity within ducts of all types. The kit may preferably include magnets strategically placed therein to prevent static electricity from preventing free movement of the gauge ball 64 in the tube 14. The tubes 102 and 96 may be simple 5/16 I.D. or ⅜ inch O.D. metal tubing either aluminum, stainless steel or plated steel. The flexible rubber tube 108 may be of the same size only made out of some sort of flexible rubber or plastic tubing. Such a kit, which is durable and virtually maintenance free, can be provided at an extremely low cost and yet provide very accurate air velocity readings.

I claim:

1. For use in measuring air velocity pressure in a duct, the velocity pressure corresponding to air velocity, a gauging system comprising a gauge including a vertically upwardly extending transparent gauge tube having an open lower end and an open upper end, said tube having a plurality of vertically spaced apart venting apertures in the side wall thereof, a vertically extending transparent shell enclosing said tube, said shell having an upper end extending above the upper end of said tube, said shell being closed at its lower end to the lower end of said tube, a light-weight ball movable in said tube to a vertical position corresponding to the pressure therein above and below said ball, and means providing an air velocity scale extending alongside said tube and increasing from said lower end to said upper end, and in which the improvement comprises first tube means for connecting the lower end of said gauge tube to the interior of the duct, said first tube means having a distal end portion with an open end pointed upstream opposite to the direction of flow of air through the duct to read total pressure including velocity pressure and static pressure, and second tube means for connecting the upper end of said shell to the interior of said duct, said second tube means having a distal end portion with an open end pointed to read the static pressure within said duct through an opening in the duct wall, whereby, the total pressure pushes upwardly on said ball while the static pressure pushes downwardly on said ball automatically to subtract the static pressure from the total pressure to provide velocity pressure.

2. The invention of claim 1 in which the distal end portion of said second tube means is a piece of flexible tubing proportioned to have its distal open end pressed upwardly against a bottom wall of the duct to surround a small opening in the wall.

3. The invention of claim 2 in which said first tube means includes a rigid L-shaped connecting tube providing said first mentioned distal portion and a downwardly extending leg portion, and a flexible tube connected between the downwardly extending leg portion and the lower end of said gauge tube.

4. The invention of claim 1 in which the distal end portion of said second tube means is proportioned to penetrate through an opening in the duct to be pointed away from upstream.

5. The invention of claim 1 in which said first tube means includes a pair of rigid connecting tubes releasably fastened together, both of said connecting tubes being generally L-shaped, one of said connecting tubes providing said first mentioned distal portion and an outwardly extending leg portion, and the other of said connecting tubes providing a vertically upwardly extending leg portion to which said gauge tube is swivelly connected and an inwardly extending leg portion connected to said outwardly extending leg portion.

6. A gauging apparatus for measuring air velocity in a duct directly on an air velocity scale, said apparatus comprising a vertically upwardly extending transparent gauge tube having an open lower end and an open upper end, said tube having a plurality of vertically spaced apart venting apertures in the side wall thereof, a vertically extending transparent shell enclosing said tube, said shell having an upper end extending above the upper end of said tube, said shell being closed at its lower end to the lower end of said tube, a lightweight ball movable in said tube to a vertical position corresponding to the pressure therein above and below said ball, and means providing an air velocity scale extending alongside said tube and increasing from said lower end to said upper end, first tube means for connecting the lower end of said gauge tube to the interior of the duct, said first tube means including at least one rigid connecting tube having a distal end portion with an open end, said connecting tube being proportioned to extend through an opening in the duct wall to have its distal end portion pointed upstream opposite to the direction of flow of air through the duct such that the pressure in the connecting tube is the total pressure in the duct, and second tube means for connecting the upper end of said shell to the interior of the duct, said second tube means including a flexible connecting tube having a distal end portion with an open end proportioned to sense the static pressure in the duct through an opening in the duct wall, whereby, the total pressure pushes upwardly upon the ball while the static pressure pushes downwardly on the ball automatically to subtract the static pressure from the total pressure to provide velocity pressure.

7. The invention of claim 6 in which said first tube means includes a pair of rigid connecting tubes releasably fastened together, one of said rigid tubes being generally L-shaped having one end portion providing said first mentioned distal end portion and a downwardly extending end portion, and the other of said rigid tubes being generally U-shaped to provide one upstanding leg connected to and supporting said transparent gauge tube and shell and scale means and one upstanding leg connected to said downwardly extending end portion.

8. The invention of claim 6 in which said first tube means includes a pair of rigid connecting tubes releasably fastened together, one of said rigid tubes being generally L-shaped having one upstanding end portion connected to and supporting said transparent tube and shell and scale means and one horizontally extending end portion, and the other of said rigid tubes being generally U-shaped to provide one leg connected to said horizontally extending end portion, another leg portion serving as said distal end portion pointing upstream and a base portion extending the opening in the duct.

9. The invention of claim 6 in which said flexible connecting tube has a relatively short length such that its distal end can be pressed against a duct wall to surround the opening therein.

10. The invention of claim 9 in which said first tube means includes a rigid L-shaped connecting tube providing said first mentioned distal portion and an outwardly extending leg portion, and a flexible tube connected between the outwardly extending leg portion and the lower end of said gauge tube.

11. The invention of claim 6 in which the distal portion of the flexible connecting tube is proportioned to extend through an opening in the duct wall to point away from upstream.

12. The invention of claim 6 in which said first tube means includes a pair of rigid connecting tubes releasably fastened together, both of said connecting tubes being generally L-shaped, one of said connecting tubes providing said first mentioned distal portion and an outwardly extending leg portion, and the other of said connecting tubes providing a vertically upwardly extending leg portion to which said gauge tube is swivelly connected and an inwardly extending leg portion connected to said outwardly extending leg portion.

13. For use in measuring velocity pressure in a walk-in duct, the velocity pressure corresponding to air velocity, a gauging system comprising a gauge including a vertically upwardly extending transparent gauge tube having an open lower end and an open upper end, said tube having a plurality of vertically spaced apart venting apertures in the side wall thereof, a vertically extending transparent shell enclosing said tube, said shell having an upper end extending above the upper end of said tube, said shell being closed at its lower end to the lower end of said tube, a light-weight ball movable in said tube to a vertical position corresponding to the pressure therein above and below said ball, and means providing an air velocity scale extending alongside said tube and increasing from said lower end to said upper end, and in which the improvement comprises a rigid, L-shaped probe tube providing a horizontally outwardly extending leg portion having an open distal end and a vertically upwardly extending leg portion, said gauge tube being swivelly connected to said upwardly extending leg portion such that said velocity scale is selectively positionable relative to said outwardly extending leg portion, said upper end of said shell being open to the interior of said duct, whereby, when a technician carries said gauge into said duct and points the said outwardly extending leg portion upstream to the air flow, the ball will move to a height corresponding to the velocity pressure.

* * * * *

UNITED STATES PATENT OFFICE
CERTIFICATE OF CORRECTION

Patent No. 3,937,082          Dated February 10, 1976

Inventor(s)  John E. Schilling

It is certified that error appears in the above-identified patent and that said Letters Patent are hereby corrected as shown below:

Column 1, line 23, after "1974" insert --now abandoned--.

Column 5, line 5, change "eiher" to --either--.

Signed and Sealed this fourth Day of May 1976

[SEAL]

Attest:

RUTH C. MASON
*Attesting Officer*

C. MARSHALL DANN
*Commissioner of Patents and Trademarks*